Feb. 13, 1923.

J. F. KOHLER

PARING MACHINE

Original Filed Oct. 25, 1919

Inventor
John F. Kohler
By his Attorney
Charles G. Hensley

Feb. 13, 1923.                          1,445,146
J. F. KOHLER
PARING MACHINE
Original Filed Oct. 25, 1919      3 sheets-sheet 2.
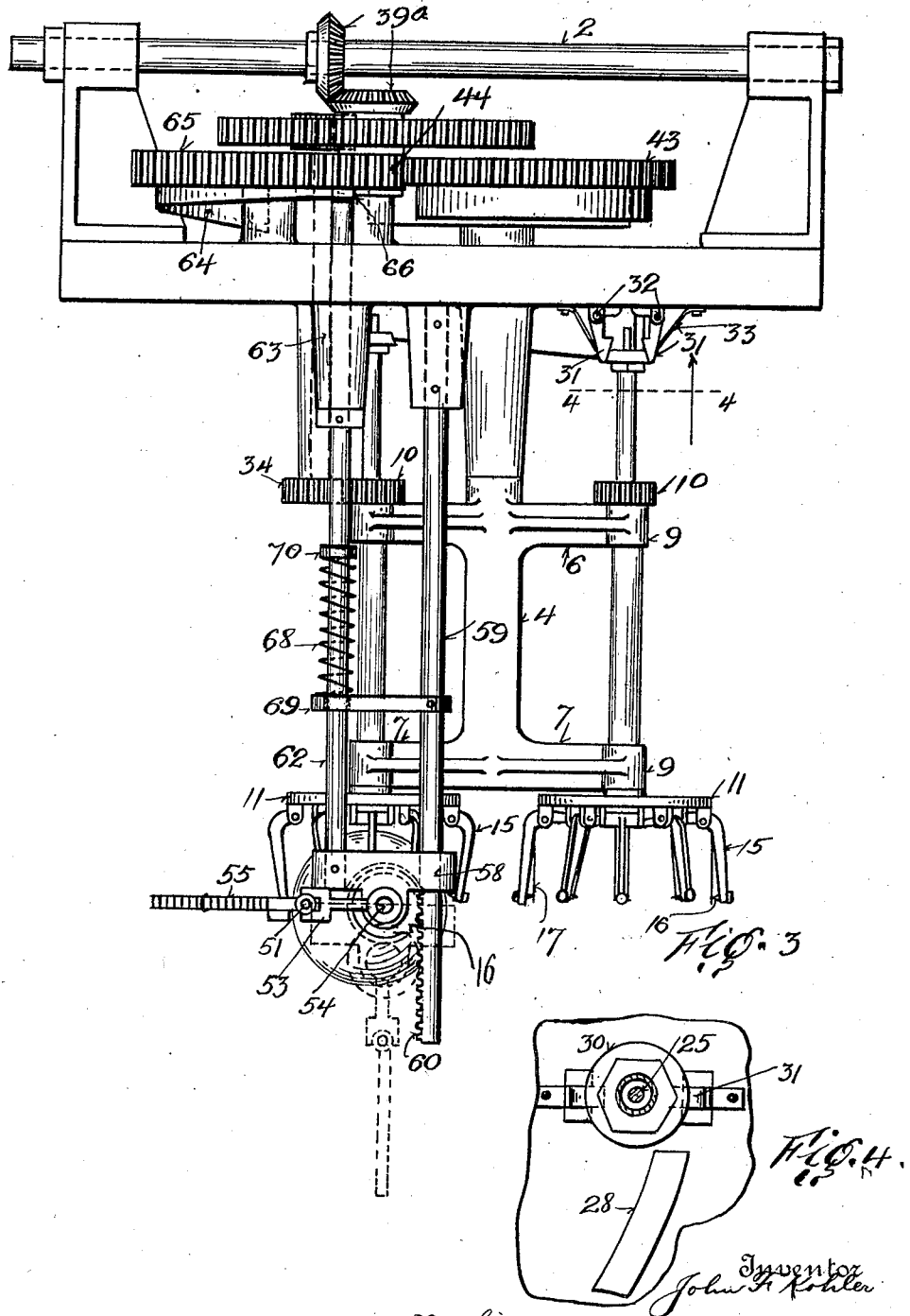

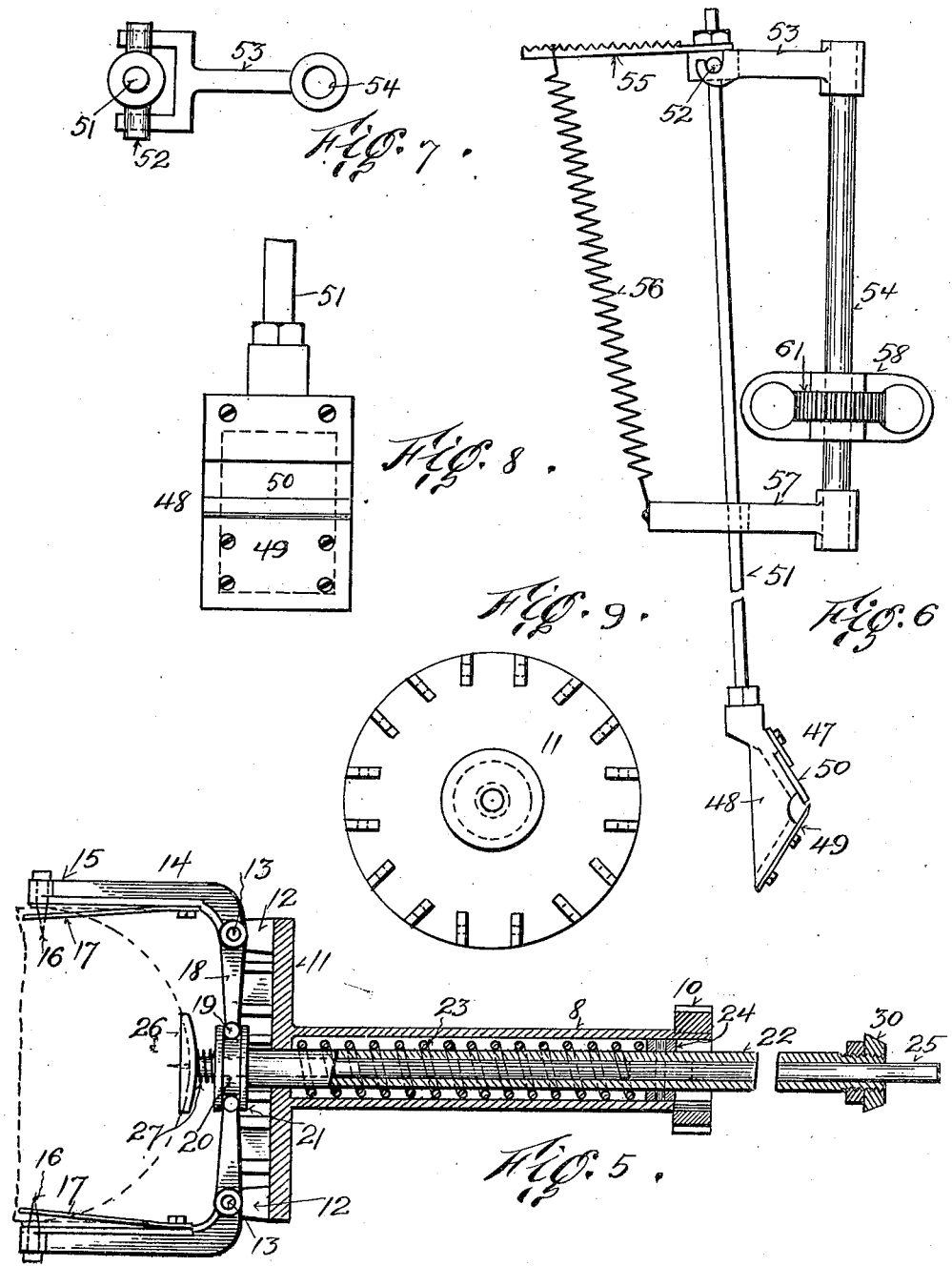

Patented Feb. 13, 1923.

1,445,146

UNITED STATES PATENT OFFICE.

JOHN F. KOHLER, OF NEW YORK, N. Y.

PARING MACHINE.

Application filed October 25, 1919, Serial No. 333,428. Renewed August 8, 1922. Serial No. 580,568.

*To all whom it may concern:*

Be it known that I, JOHN F. KOHLER, a citizen of the United States, and a resident of the city, county, and State of New York, have invented certain new and useful Improvements in Paring Machines, of which the following is a specification.

My invention relates to machines for paring edible products. While the machine is useful for other purposes it is especially adapted for paring the thin brown skin from the meat or kernels of cocoanuts. When a cocoanut has had its shell removed there is left the nearly round ball or kernel which is covered with a thin brown skin and it is desirable, in preparing the cocoanut for commercial uses, to remove this skin without injuring the kernel of the cocoanut and with as little loss of the latter as possible in the paring operation. The object of my present invention is to provide a machine which will pare the skin from the cocoanut evenly, rapidly and with a minimum loss of meat. The machine embodies simple means for holding and revolving the cocoanut without injuring it, means for presenting the cocoanuts successively into position for paring, means for paring the cocoanuts and means for ejecting them after paring. The device is simple in construction and operation and it is adapted to pare the cocoanuts as fast as the operator can feed them to the machine.

In my copending application Ser. No. 313,751 I have shown and described a machine for the above mentioned purpose and the present machine constitutes a further advance in the art. One of the objects of the present device is to so operate the paring knife that it will be maintained at the same angle relatively to the cocoanut throughout the whole paring operation in order that the paring operation will be uniform. The paring knife resembles a spoke shave and it will be apparent that if the angle of the knife relatively to the cocoanut changes during the paring operation that the action of the knife will not be uniform and the cocoanut will not be pared uniformly. The present machine includes simple means for moving the knife in an arc and for maintaining the same angular relation between the knife and the periphery of the cocoanut.

Another object of my invention is to provide efficient means for gripping the cocoanut and for releasing it after the paring operation has been completed. Another object is to provide for a momentary dwell of the knife at the middle of the cocoanut before it starts its arcuate movement in order that the knife may remove a shaving completely encircling the cocoanut in order that one half the cocoanut will be pared while in the machine.

I prefer to arrange the turret carrying the holders in a horizontal position because it is easier for the operator to see the cocoanuts and to quickly position them in the holders and it is easier for the ejector to displace the pared cocoanuts from the machine. To arrange the turret in a horizontal rather than a vertical position it is necessary for the grippers to take hold of the cocoanut as soon as it is positioned and the present device is constructed for such purpose.

Another and very important object of my invention is to provide means for holding the cocoanuts in such manner that the gripping force will have no effect on the revolving motion of the holder during paring.

In the drawings forming part of this application,

Figure 3 is a plan view of the machine,

Figure 4 is a sectional view taken on the line 4—4 of Figure 3,

Figure 5 is a longitudinal sectional view through one of the holders,

Figure 6 is a detail view of part of the shaving device,

Figure 7 is a detail view of the knife arm fulcrum,

Figure 8 is a face view of the paring knife, and

Figure 9 is a face view of one of the holders.

Figure 1:
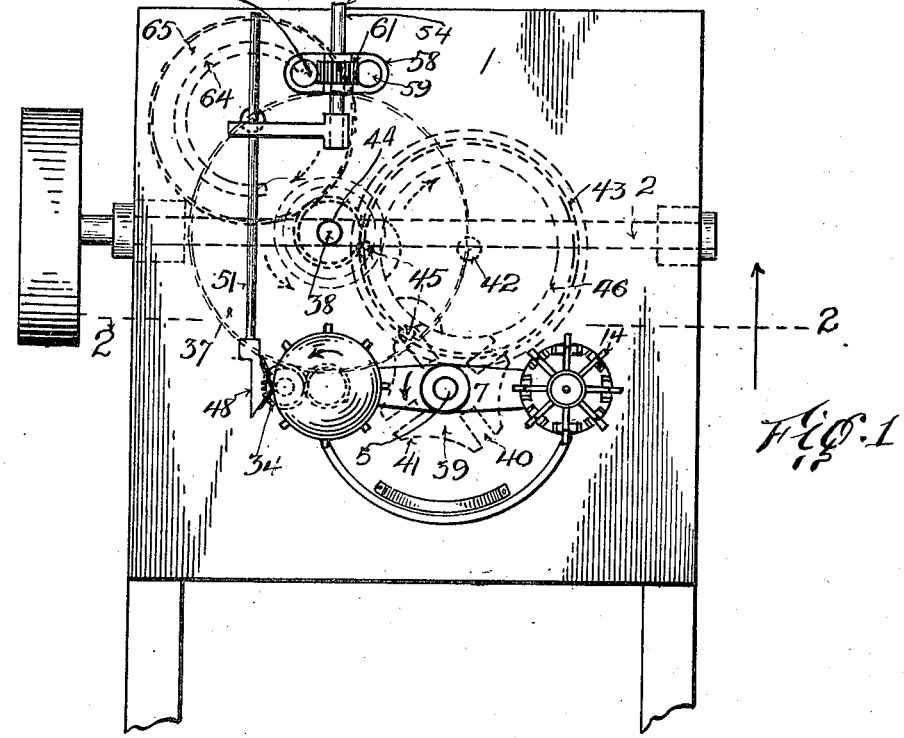
Figure 1 is an elevation of my improved machine.

I have mounted the device on a frame 1 having suitable brackets and bosses for supporting the working parts of the machine.

The operating force for the several parts is distributed from the main shaft 2 which latter is operated in any desired manner, preferably by a belt engaging over the pulley 3.

The turret which carries the cocoanut holders as well as various shafts, project horizontally from the frame 1. The turret comprises a frame 4 which revolves intermittently with the shaft 5 on which it is mounted; and it has oppositely extending arms 6, 7, which carry the cocoanut holders.

There are two holders shown herein and as they are both alike a description of one will answer for both, similar reference numerals being applied to both holders.

Each holder comprises, in part, a sleeve 8 journaled in bearings 9 one of the arms 6 and in journals 9 in one of the arms 7. Just inside the arms 6 the sleeves 8 are each provided with a small gear 10 by means of which the holders are revolved as will be pointed out hereinafter. Each sleeve 8 carries a plate or head 11 extending at right angles to the sleeve and this plate has a number of projecting ears 12 in which the pivots or pins 13 are mounted and on which pins the angle levers 14 fulcrum. These levers constitute the members for gripping the cocoanut and they are arranged radially around the plate 11. The outer arms 15 of these levers receive the cocoanut between them when the levers are swung out or opened, and each of these arms carries a tool or pin 16 for piercing the cocoanut but not sufficient to extend entirely through the wall of the cocoanut. The purpose of these pins or piercing members is to secure a positive grip on the cocoanut. To facilitate the disengagement of the pins from the cocoanut following the paring operation I provide springs 17, one for each pin and through which the pins project. As the arms 15 are swung inwardly toward the cocoanut, the springs 17, which are carried by the arms 15, contact with the cocoanut and are held by the latter while the arms 15 approach the cocoanut. While the springs 17 are thus held, the pins 16 pierce the cocoanut to hold it firmly in place. When the arms 15 are swung outwardly, after the cocoanut has been pared, the springs 17 prevent the cocoanut from following the pins 16 or in other words they eject the cocoanut from the pins so that it is free to be ejected from the machine. This insures a positive disengagement of the cocoanut in connection with means for positively holding and revolving it.

The several levers 14 are revoluble with the head 11 and the sleeve 8. The arms 18 of these several levers have bearing members 19 which engage in the groove 20 of a head 21 on the end of the sleeve 22 which is adapted to move lengthwise within the outer sleeve 8. It will be obvious that if the sleeve 22 is moved lengthwise, the head 21 will act on the several arms 18 and rock the levers 14 either to open the gripping arms 15 or to close them upon a cocoanut. There is a coiled spring 23 arranged in the space between the inner and outer sleeves 22, 8, which presses at one end against the head 11 and at its opposite end it presses against the collar 24 secured to the inner sleeve 22.

This spring tends to retract the sleeve 22 or to draw it toward the right in Figure 5 for the purpose of swinging the lever arms 15 toward the cocoanut. When this spring is permitted to exert its pressure on the sleeve 22 it holds the lever and arms 15 pressed tightly against the cocoanut and it constitutes means for holding the cocoanut without in any way interfering with or resisting the rotation of the cocoanut holding device; i. e. it in no way retards the revolution of the sleeve 8 and all that turns with it. This is important for the reason that the holding device may be operated at high speed with very little friction.

There is a rod 25 extending through the inner sleeve 22 and on one end it carries a disk or plate 26 having a concave top surface adapted to conform to the curvature of the product and against which surface the product is adapted to rest as is indicated in dotted lines in Figure 5. There is a coiled spring 27 arranged between the member 26 and the head 21 which tends to move the rod 25 to the left in Figure 5. On one end of the outer sleeve 8 there is a small gear 10 through which the holder as a whole is revolved, as will appear hereinafter.

Figure 2:
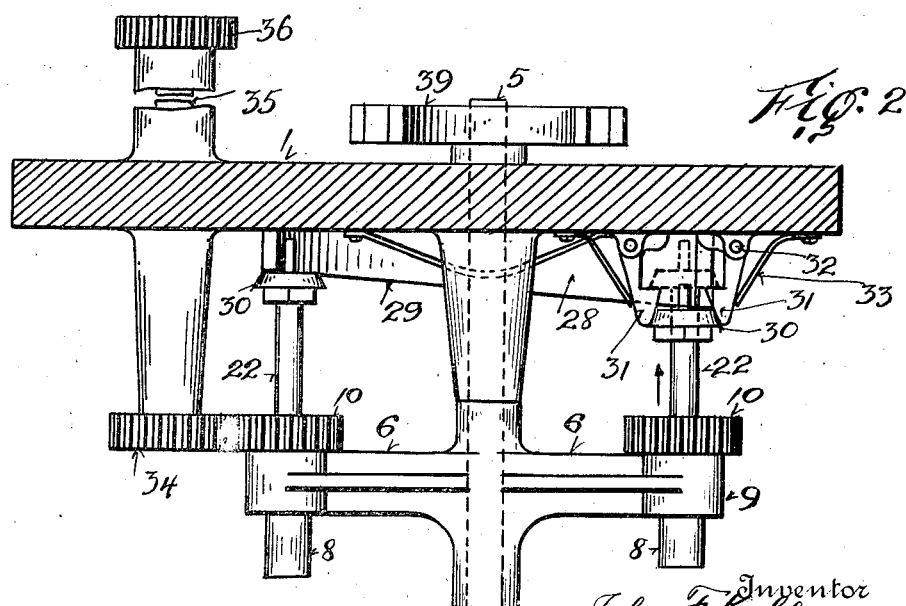
Figure 2 is a sectional view taken on the line 2—2 of Figure 1.

The turret, if it carries two holders as shown herein, is revolved intermittently one half revolution at a time in order to carry one cocoanut into paring position and to position the other holder to receive a cocoanut. On the frame 1 there is a stationary cam track 28 having an inclined cam edge 29, and on the rod 25 there is a roller 30 which engages the edge 29 of this cam. As the turret makes a half turn, the roller 30 on the holder which is in paring position moves into engagement with the cam edge 29 and as the turret continues its motion the cam acts on the roller to gradually force the sleeve 22 outwardly against the action of the spring 23; and this opens the lever arms 15 to release the cocoanut and at the same time the rod 25 moves outwardly and ejects the released cocoanut from the holder. The rollers 30 are frusto conical and just as they reach the highest point of the cam track 28, at which time the arms 15 are opened to their maximum extent, the roller 30 moves into position in front of the pair of triggers 31 at the time the holder comes to rest. These triggers are mounted upon pivots 32 to swing toward each other, being pressed by the springs 33 and when closed as shown in Figure 2 they hold the roller 30 and the sleeve 22 in the position to which these were moved by the cam track 28, with the clamping levers 15 opened, as shown at the right in Figure 2. While the turret is temporarily stationary the operator places a cocoanut between the open clamping arms 15 and presses the end against the plate 26 with sufficient force to move the sleeve back 22. This will cause the roller 30 to force open the triggers 31 and when the roller has passed between them as shown in dotted lines in Figure 2, the triggers snap back into position to receive the roller of the next holder when the turret turns again. These triggers serve to hold the clamping arms 15 open while the operator is inserting a cocoanut into the holder and they permit the sleeve 22 and rod 25 to be forced back so that the cocoanut may be gripped by the arms 15 before the turret moves to carry the cocoanut into paring position.

Each time the turret makes a half turn one of the gears 10 on one of the sleeves 22 is brought into mesh with the gear 34 and these gears continue in mesh during the period that the turret remains idle. The gear 34 is mounted upon the shaft 35 and at the other end of this shaft there is a gear 36 which meshes with and is driven by the large gear 37 on the shaft 38. The latter shaft is driven from the main shaft through the mitre gears 39ª.

The turret is revolved by a modified Geneva movement one half turn at a time. On the shaft 5 which carries the turret there is an ordinary Geneva movement disk 39 having the radial slots 40 and the intermediate locking surfaces 41. On the shaft 42 there is a gear wheel 43 which is driven by a gear wheel 44 on the shaft 38; and the gear 43 has two pins 45 projecting from its surface for engaging the slots 40 in the disk 39. During one complete revolution of the gear 43 one of the pins 45 enters one of the slots 40 and it causes the disk 39, and consequently the turret, to turn a quarter revolution or 90° and immediately after this takes place the second pin 45 enters another slot 40 of the disk 39 and it causes the latter to make another quarter turn. These two quarter turns, following in quick succession, revolve the turret a half revolution, moving one holder from the receiving position. During the inactive periods of the turret the disk 39 is locked by the flange 46 on the gear 43, the same as with the ordinary Geneva movement.

The device for paring the cocoanut is constructed as follows: The knife 47 comprises a holder 48 having a blade 49 attached thereto and there is a guard 50 to control the depth of cut of the blade. The holder 48 is carried upon the arm 51 which swings from the pivot 52 rocking in the fork 53 on the shaft 54. There is an arm 55 attached to the knife arm 51, extending outwardly therefrom and to which one end of a spring 56 is attachable at various distances from the pivot 52. The other end of this spring is attached to a fork 57 also carried by the shaft 54; the purpose of the spring being to rock the knife arm 51 to hold the knife in contact with the revolving cocoanut. The shaft 54 is journaled in a block 58 which slides along the fixed bar 59 parallel to the holder. The bar 59 has rack teeth 60 with which a pinion 61 on the shaft 54 meshes. The block 58 is attached to a rod 62 lying parallel with the rod 59 and the rod 62 reciprocates in a bearing hub 63 on the frame of the machine. This rod is reciprocated by means of a cam 64 mounted on the side of the gear wheel 65. At the commencement of the cam 64 there is a straight portion 66 which causes the rod 62 to dwell for a brief period before it starts its outward movement. The gear wheel 65 is operated by the gear wheel 44 on the shaft 38.

Operation: The operator places the cocoanuts one at a time in the holders as they are presented at the right hand position in Figure 3. When a holder is moved to this position the clamping arms 15 are held open by means of the triggers 31 and the operator places the cocoanut between the arms 15 with the end against the plate 26 and when the cocoanut is properly centered, it is pressed inwardly, until the sleeve 22 is forced back. This will cause the roller 30 to open the triggers and pass between them, whereupon the spring 23 forces the sleeve 8 back and closes the arms 15 upon the cocoanut. This all takes place while the holder is stationary, and as the pins 16 pierce the cocoanut the latter is positively gripped and held, with one half the cocoanut free or exposed for the paring operation. From this moment until the paring operation has been completed the cocoanut is held by the action of the spring 23 which offers no resistance to the revolution of the holder, whereas, in my said copending application the force for clamping the cocoanut is transmitted from a non-revolving member and the clamping force more or less resists the revolution of the holder.

As the cocoanut is clamped as soon as the roller 30 snaps past the triggers 31 it is not dislodged when the turret moves, even through the turret turns on a horizontal axis as shown herein. By the time the cocoanut has been clamped in the holder the turret is caused to move two quarter turns to complete a one half revolution, by means of the pins 45 acting on the disk 39, and this brings the newly filled holder into position near the paring knife. As the holder moves into this position the gear wheel 10 comes into mesh with the gear wheel 34 and the holder and cocoanut then commence to revolve rapidly. At the moment that the holder commences to revolve, the knife is positioned at or about the central line of the cocoanut and at this moment the rod 62 engages the straight portion 66 of the cam 64. The rod 62 will dwell long enough to permit the holder to make one revolution in order that the knife will pare entirely around the cocoanut before it commences to make its arcuate movement around the cocoanut. Otherwise, one half the cocoanut would not be completely pared in the operation. As the inclined part of the cam 64 commences to operate on the rod 62 it moves the latter outwardly, parallel with the rod 59. This causes two distinct movements the resultant of which imparts the required movement to the knife shaft. At the commencement of the movement the arms 53, 57 which carry the knife arm 51 are in the position shown in Figure 3, so that the knife touches the cocoanut at the central line thereof. After the holder has made at least one complete rotation the block 58 moves outwardly and the shaft 54 moves with it, until the shaft 54 and the block 58 reach about the dotted line position of Figure 3. While this movement is taking place the pinion 61 is traveling in mesh with the rack 60 and this causes the shaft 54 to revolve until the arms 53, 57 reach a position 90° from their starting position. The knife 47 is thus moved in an arc from a point on the equatorial line of the cocoanut to its apex. The combined movement caused by the turning of the shaft 54 and by its reciprocation maintains the knife at a uniform angle relatively to the surface of the cocoanut during the paring operation and as a result the half of the cocoanut is completely pared.

When the knife reaches the apex of the cocoanut the cam 64 will cease acting on the rod 62 and the latter is returned by the compression spring 68 arranged between the collar 68 secured to the rod 59 and the collar 70 secured to the rod 62. When the paring operation has been completed the turret makes another half turn. As the turret turns, the roller 30 on the holder moving away from paring position engages the cam 28 which forces the rod 25 and sleeve 22 outwardly. This opens the clamping arms 15 and forces the plate 26 outwardly so that the pared cocoanut is ejected from the holder.

Only one half the cocoanut is pared in the above operations. The cocoanuts may be reversed and returned to the holders in the same machine for paring the remaining half but I prefer to pare one half the cocoanut on one machine and to have the cocoanuts pass along to a second machine for paring the second half instead of returning them to the same machine as this saves time in handling, although either method may be followed.

Having described my invention, what I claim is:

1. A machine for paring edible products comprising a paring knife and means for moving it in relation to the product, and means for holding and revolving a nut or similar article in relation to the paring knife, comprising clamping arms adapted to receive a portion of the article between them and piercing members carried by said arms and adapted to pierce the article for the purpose set forth.

2. A machine for paring edible products comprising a paring knife and means for moving it in relation to the product, and means for holding and revolving a nut or similar article in relation to the paring knife, comprising clamping arms adapted to receive substantially one half of the article between them leaving substantially one half thereof exposed to the action of the paring knife, and piercing members carried by said arms and adapted to pierce the article at or near the middle line thereof for the purpose set forth.

3. A machine for paring edible products comprising a paring knife and means for moving it in relation to the product, and means for holding and revolving a nut or similar article in relation to the paring knife, comprising movable clamping arms adapted to receive a portion of the article between them, piercing members carried by said arms for piercing the article to grip the same and means for preventing the article from following said piercing members as the latter are withdrawn from the article.

4. A machine for paring edible products comprising a paring knife and means for moving it in relation to the product, and means for holding and revolving a nut or similar article in relation to the paring knife, comprising movable clamping members adapted to receive a portion of the article between them, piercing members carried thereby for piercing the article to grip the same and resilient members arranged near said piercing members and adapted to be retracted as the piercing members pierce the article and adapted to eject the article from the piercing members as the latter withdraw from the article.

5. A machine for paring edible products comprising a paring knife and means for moving it in relation to the product, and means for holding and revolving a nut or other article in relation to the paring knife, comprising a revolving holder and means for revolving it, movable clamping members, on said holder adapted to receive a portion of the article between them and means for pressing the clamping members against the article and adapted to operate without resisting the revolution of said holder.

6. A machine for paring edible products comprising a paring knife and means for moving it in relation to the product and means for holding and revolving a nut or similar article in relation to the paring knife, comprising a revolving holder and means for revolving it, movable clamping members on said holder adapted to receive a portion of the article between them and means carried entirely by said holder for pressing the clamping members against the article for the purpose set forth.

7. A machine for paring edible products comprising a paring knife and means for moving it in relation to the product and means for holding and revolving a nut or similar article in relation to the paring knife, comprising a revolving holder and means for revolving it, movable clamping members on said holder adapted to receive a portion of the article between them, a spring carried by said holder for closing said clamping members on the article and stationary means for opening said clamping members.

8. A machine for paring edible products comprising a paring knife and means for moving it in relation to the product and means for holding and revolving a nut or similar article in relation to the paring knife comprising a revolvable turret and means for revolving it intermittently, holders for the articles, carried by said turret, clamping members carried by said holders and adapted to receive a portion of the article between them, a spring for pressing said clamping members against the article, and means for temporarily holding said clamping means open and adapted to be released while the holder is stationarily held in receiving position.

9. A machine for paring edible products comprising a paring knife and means for moving it in relation to the product and means for holding and revolving a nut or similar article in relation to the paring knife, comprising a holder and means for revolving it, movable clamping members carried by said holder and adapted to receive a portion of the article between them, a spring for pressing said clamping members against the article, and means for temporarily holding said clamping members open and adapted to be released by the article to be pared to cause said clamping members to grip the article.

10. A machine for paring edible products comprising a paring knife and means for moving it in relation to the product, a turret and means for rotating it intermittently, revolvable holders carried by said turret and having clamping members adapted to receive a portion of the article between them, a spring for closing said clamping members on the article, a cam adapted to open said clamping members as the turret rotates, a trigger adapted to temporarily maintain said clamping members open and means engaged by the article inserted into the holder for releasing said trigger to cause the clamping members to grip the article.

11. A machine for paring edible products comprising means for holding and revolving a nut or similar article, and means for paring the same, comprising a paring knife and a knife holder and means for operating said knife holder, comprising means adapted to cause said knife to dwell at or near the equatorial line of said article while the latter is revolving and to cause the knife to thence move in an arc toward the apex of the article.

12. A machine for paring edible products comprising means for holding and revolving a nut or similar article in relation to the paring knife, including clamping arms adapted to receive substantially one half of the article between them leaving substantially one half thereof exposed to the action of the paring knife, a paring knife and a knife holder, and means for causing said knife holder to move in an arc and to simultaneously reciprocate substantially parallel to the axis of the revolving article whereby the knife will engage the article near its equatorial line and travel to the apex thereof.

Signed at the city, county and State of New York, this 22nd day of October, 1919.

JOHN F. KOHLER.